Patented Aug. 31, 1948

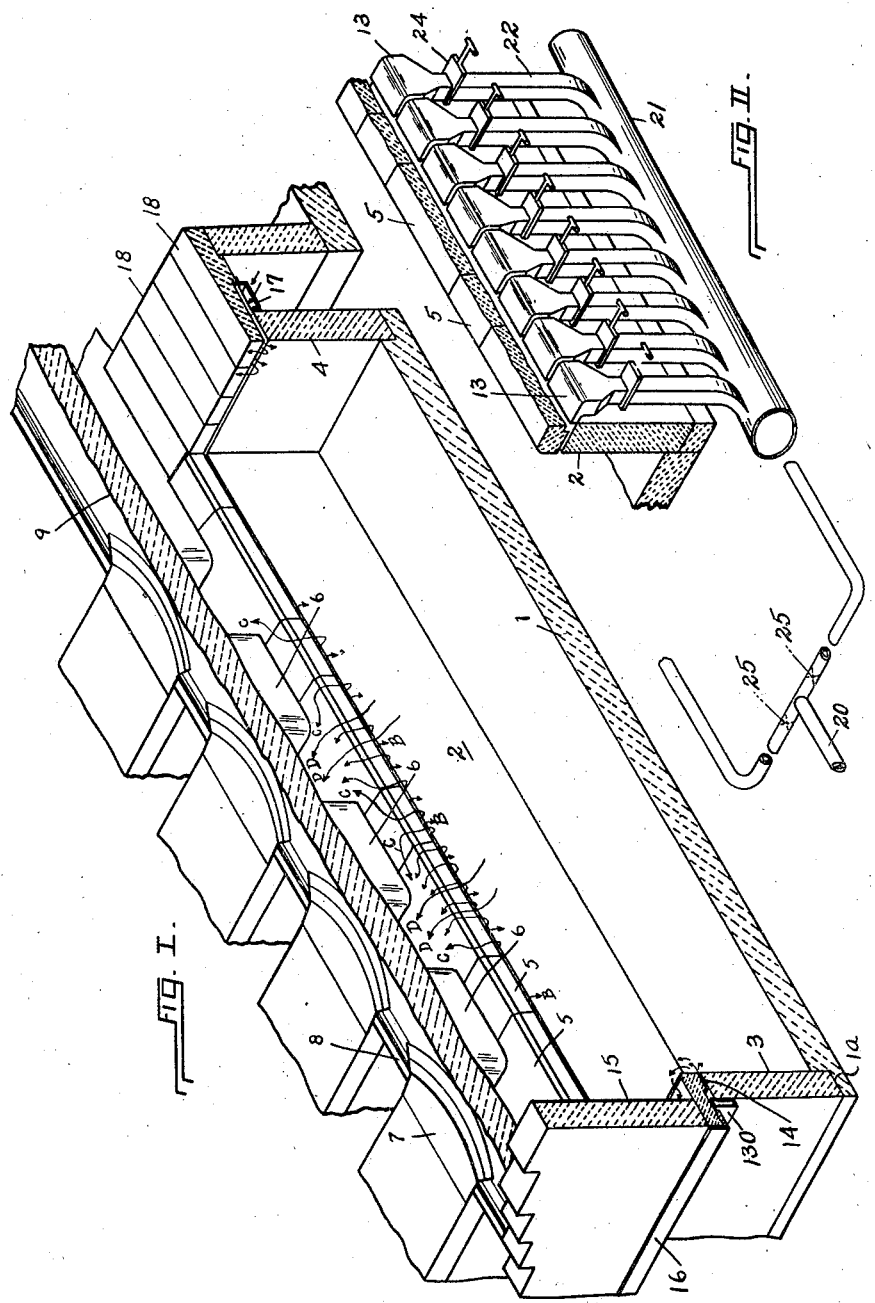

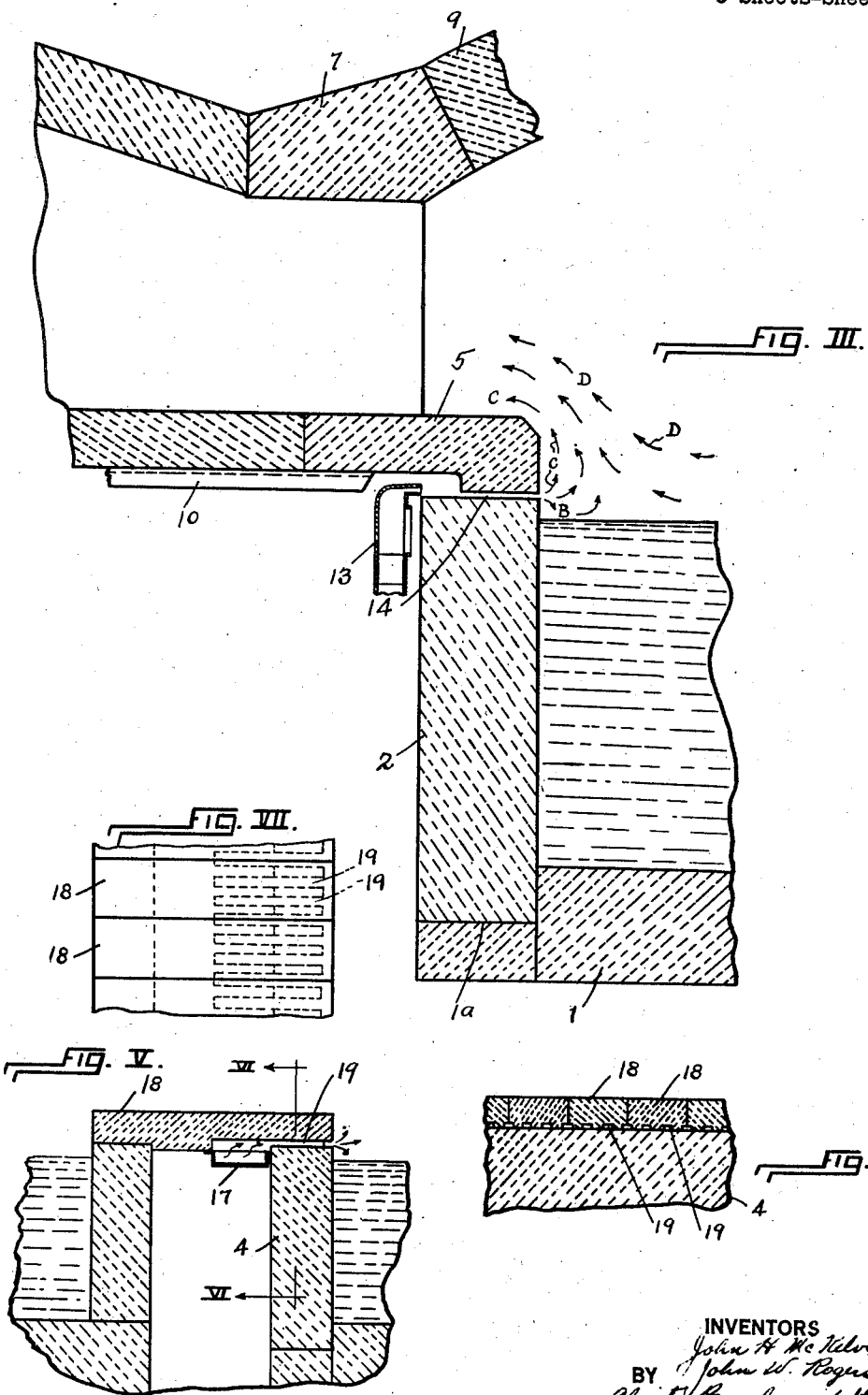

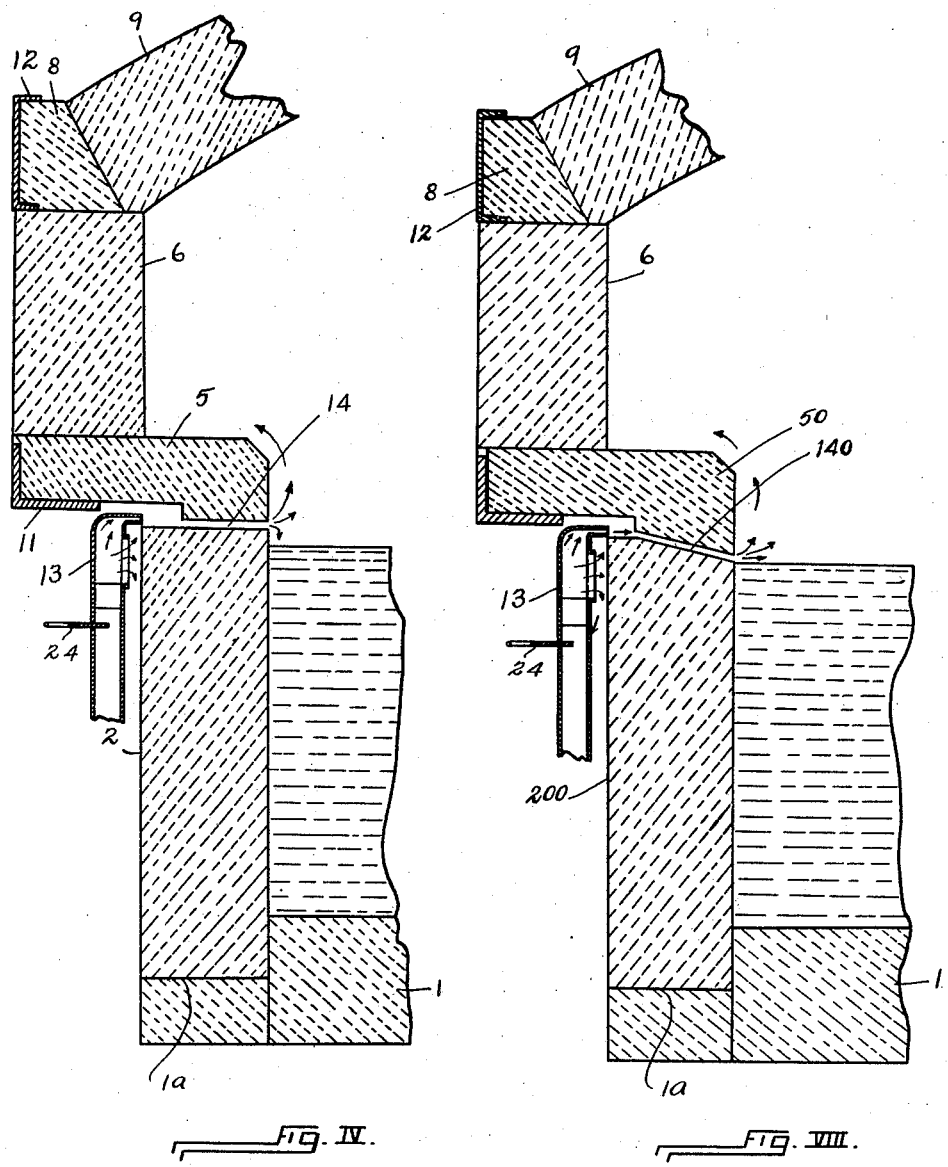

2,448,451

UNITED STATES PATENT OFFICE 2,448,451

GLASS FURNACE AND METHOD OF OPERATION

John H. McKelvey and John W. Rogers, Kirkwood, Mo., assignors to Laclede-Christy Clay Products Company, St. Louis, Mo., a corporation of Missouri Application March 16, 1942, Serial No. 434,834

7 Claims. (Cl. 49—54)

This invention relates to the structure and operation of glass melting and refining furnaces and has for its object a furnace of high efficiency and durability, capable of successful operation with minimum repair through long periods, with maintenance costs reduced and productivity high.

A furnace of the invention is illustrated in the accompanying drawings. Fig. I is a view in isometric perspective of the furnace of the invention, cut on a longitudinal and vertical plane of section. The furnace is incompletely shown. The melting end of the furnace and the bridge wall are included in the showing, but the prolongation of the furnace beyond the bridge wall, the refining and delivery end of the furnace, is indicated merely. And it will be understood that there is the usual passageway (not shown) for the flow of molten glass from the melting end, beneath the bridge wall, to the refining and delivery end. Fig. II is a fragmentary view in isometric perpective, and to somewhat smaller scale, of the proximate wall of the furnace as seen in Fig. I (the the wall not included in the showing Fig. I). Portions of the apron blocks and tuck-stones are shown; the remainder of the superstructure is broken away. Figs. III and IV are fragmentary views, to larger scale, on vertical and transverse section—Fig. III through an apron block and a port in the side wall of the furnace; Fig. IV through a tuck-stone and a jamb block. Fig. V is a fragmentary view in vertical section through the bridge wall, on a plane that is longitudinal with respect to the furnace as a whole (a plane such as that of Fig. I), but transverse with respect to the extent of the bridge wall. Fig. VI is a detail view in section, on the plane indicated at VI—VI, Fig. V. Fig. VII is a fragmentary view in plan of the bridge wall. Fig. VIII is a view which, corresponding to Fig. IV, illustrates a modification in detail.

The furnace includes tank and superstructure. The tank consists of floor 1, side walls 2, and end walls 3. It is of general rectangular form and its continuity from end to end is interrupted by bridge-wall 4. The portion of the tank on the nearer side of the bridge-wall, as seen in Fig. I, is the melting end; the portion beyond the bridge-wall is the refining and delivery end. The superstructure is essentially an overarching vault, beneath which at the melting end flame plays upon the furnace charge, and at the refining and delivery end heat is confined. At the melting end, ports are formed at the base of the vault, through which flow the heat-affording gaseous streams. Specifically, the superstructure as here shown includes apron block and tuck-stones 5 that in endless succession overhang the side walls of the tank and form the sills of the ports, jamb blocks 6 spaced in succession to define the ports, lintel block 7, and intervening skew blocks 8 that, in continuity with the blocks 7, form support for the vault, and the vault 9 itself, resting on the lintel blocks and skew blocks. These blocks 5 that form the sills of the ports are called apron blocks; the blocks 5 that alternate with the apron blocks and upon which the jamb blocks 6 are centered are called tuck stones.

While the features of structure in which invention resides are applicable to direct-fired or continuous furnaces and to regenerative or reversing furnaces alike, they here are shown by way of example in a furnace of the latter type; and certain features of invention relate themselves specifically to reversing furnaces. In a reversing furnace flame springs from the line of ports on one side of the furnace and flows transversely over the surface of the pool of glass within the tank, and the products of combustion have egress through the ports on the opposite side. Periodically the direction of flame flow is reversed, and the flame enters through the ports that had served as egress, and the products of combustion escape through the ports that had served as inlet ports.

In the specifications of Letters Patent of the United States Nos. 2,077,705 and 2,163,405 granted on our applications we have shown a structure in which the blocks that form the side walls of the tank rest upon the floor in a meeting plane that is coincident with the floor surface; while, as shown in the drawings of this application, the side walls are "benched" upon the floor. That is to say, the marginal floor blocks are offset, so that the wall rests upon the floor blocks at 1a, in a meeting plane that is below the floor surface. In this particular the structure of this application is superior; for a tendency is corrected which is present in the structure of the patents named— the tendency, namely, of the molten glass to erode and under-cut the side walls in an erosion that begins at the plane of the floor surface and progresses outwardly and upwardly. The otherwise preferable, "benched" structure of the drawings of this application is not desirable in the tanks of the patents named, because the tank walls of those patents carry part of the superstructure, and, so burdened, they are not freely responsive to thermal expansion and contraction. In the course of continued operation, the walls, if they were benched, would tip, and in tipping would bring about too rapid deterioration.

The usual arrangement, exemplified in the prior patents named, of resting the apron blocks and tuck blocks upon the tank walls has been adopted and adhered to, because of the supposed necessity of a tight joint between tank and superstructure, to prevent "sting-out"—that is to say, the protrusion of tongues of flame from the furnace chamber.

It is our discovery, not merely that the superstructure may be independently sustained, so that the side walls of the tank, relieved of superposed burden, may be built with benched base (and with consequent advantage), but that the superstructure overhanging the tank walls may at its periphery be spaced from the tank walls at a small but sufficient interval, and that such interval, instead of being a feature that is disadvantageous and forbidding, may actually be turned to advantage and may become a feature of a furnace of superior utility.

In the prior patents named, and in a yet earlier patent, 1,989,103, as well, we have described means for cooling the molten glass within the tank at the surface and along the margin of the pool, with the end in view of reducing the rate of erosion of the blocks of refractory material that form the side walls of the tank; and the means have consisted in recesses or pockets formed in the blocks that constitute the side walls. These recesses or pockets extend near to the inner faces of the blocks, and to them from the outside streams of cooling air are conveyed. In one of the earlier patents named above, No. 1,989,103, air passageways are formed in the blocks in a succession of series, at different distances from the inner face of the wall, so that, as an inner series is by erosion broken through, the flow of cooling air may be diverted and caused to flow in the passageways of an outer series; and in Patent 2,077,705 the air passageways are so shaped that, in case molten glass breaks through, it will freeze and harden; but in every case the provision is such that the streams of cooling air shall not have access to the furnace chamber. Valuable as the structures of those prior patents are, our present invention proceeds upon a somewhat different theory, and is realized in a simpler and cheaper structure. The invention involves perception of the fact that, instead of sedulously excluding cold air from the furnace chamber, its introduction in limited quantity and under properly controlled pressure is not only effective in accomplishing the cooling effect previously gained, but is attended with other advantages.

We employ plain blocks, unelaborated in shape; and herein is saving of cost. We cause cooling air to flow upon the outer surfaces of the blocks at the upper edge of the tank and over the upper edges of the blocks at the rim of the tank, through the space at which the apron blocks and tuck blocks of the superstructure stand spaced from the walls of the tank.

Referring to the drawings of this application, the apron blocks and tuck blocks 5 are shown to be sustained upon structural steel angles 10 (upon which the successive apron blocks rest along their opposite lateral edges). The alternate tuck blocks, additionally supported along their rear edges by angles 11, carry the jamb blocks 6. The skew blocks and lintel rest upon the jamb blocks, and the vault itself is additionally supported by channels 12. The structural members 10, 11, 12 arranged as shown, will be understood to be mounted upon and carried by the backstays (not shown). Thus, the whole superstructure is carried free from and independently of the tank; and, as has been said, the apron blocks and tuck blocks stand spaced at a slight interval from the tank blocks at the rim of the tank.

Cold air under pressure is carried in a suitable main 20. From it manifolds 21 are supplied. These manifolds extend on each side and throughout the longitudinal extent of the melting portion of the furnace. Branches 22 lead from the manifolds to headers 13. These headers in close rank extend along the side walls of the tank at its upper edge; and from them, through suitable orifices, cold air is caused to impinge upon and to spread with cooling effect upon the adjacent outer surfaces of the tank blocks; and, additionally, from the headers 13 cold air under pressure has access to and flows in a thin sheet through the narrow space interval 14 at which the overhanging superstructure is spaced from the rim of the tank. The width of the interval 14 may be of the order of an inch, more or less. In the branches 22 are set blast gates 24. These are manually adjustable, and by their adjustment the quantity and the pressure of the air that flows to and through the headers 13 is controlled.

In normal operation the pressure within the furnace somewhat exceeds atmospheric. The pressure under which cold air is maintained in headers 13 is sufficient to cause cooling air to stream over the outer surfaces of the blocks, and also to prevent egress of flame from within the furnace outward through the slot 14. In normal operation the pool of molten glass fills the tank nearly to the brim. The cold air playing upon the blocks as described and streaming over the rim of the tank has the desired cooling effect upon the glass. Viscosity is increased at the surface and at the margin of the pool, the rate of flow of molten glass in circulating streams within the body of glass is reduced at the tank walls; the region of rapid circulation is shifted inward and away from the walls; and the erosive action of the glass upon the refractory substance of the walls is diminished. The cooling effect is accomplished; sting-out is prevented; and the cooled air, entering the furnace chamber, is caught up in the stream of flame and carried with it.

In furnace operation it is desirable that on the intake side of the furnace the cold air injected through slot 14 shall be slightly more than sufficient to prevent sting-out. It should be slightly in excess, both to insure its effectiveness in preventing sting-out, and also because a slight excess is valuable in increasing the viscosity of the glass at the margin of the pool. This already has been explained. On the exit side, however, the outgoing side of the furnace, a larger volume of injected air is desirable, and this is obtained by injecting the air under greater pressure on the exit or outlet port side of the furnace than on the intake or firing port side. This side is the down-stream side with respect to the flame flow, and it is manifest that the injected cold air, meeting the oppositely flowing stream of flame, is by that stream diverted and carried with the stream through the ports. In its diversion the cold air sweeps immediately over the surfaces of the apron blocks and the tuck blocks and affords a blanket upon them, protecting them from the destructive effect of the flame in prolonged furnace operation. This cooling effect, furthermore, tends to maintain the temperature of the tuck blocks and apron blocks below the point of fusion of the substance of these blocks, and so to prevent the dripping of fused material from the blocks above upon the tank blocks below. The several blocks, chosen for specific services, differ from one another in the matter of basic and acidic character; and the dripping from one block upon another is likely at these high temperatures to bring about reaction such as to cause the blocks more rapidly to be eroded and worn away. This danger, as has been said, is prevented and guarded against by the cooling effect of the stream of air that envelops and blankets the apron blocks and tuck blocks on the outlet side of the furnace.

Still referring to Fig. II, provision is diagrammatically indicated of means for reversing the pressure conditions in the headers 13 on the two sides of the furnace in accordance with the reversal of the furnace itself. In the branches from the main 20 to the manifolds 21 valves 25 are set; and by the adjustment of these valves the ends that have been indicated may be gained.

In the drawings, arrows indicate flow of air and flame in the furnace chamber. The arrows B indicate the play of cold air upon the surface of the glass at the margin of the pool; the arrows C indicate the protecting stream of cold air that passes over the faces of the apron blocks and tuck blocks on the out-flow side of the furnace; and the arrows D indicate the flow of flame and of products of combustion.

Since temperatures are higher and operating conditions more severe rearwardly toward the proximate wall, Fig. I, than forwardly toward the bridge wall, the injection of air will in normal operation, by proper setting of the blast gates 24, be effected in larger quantities toward the rear wall than toward the bridge wall of the furnace.

In Figs. III and IV the wall blocks are indicated to be square-cornered at the rim of the tank, and the space 14 is indicated to be horizontal in its extent. The sheet of cold air is in this case injected at a level slightly above the glass-line. In Fig. VIII the wall blocks 200 are indicated to be beveled at the rim of the tank; the bevel extends downward and inward; and the apron blocks and tuck blocks 50 are indicated to be correspondingly shaped, to afford a space 140 that is oblique in its extent, and the injected air is impinged directly upon the glass. This obviously, with enhanced cooling effect.

At the rear of the furnace the curtain wall 15 of the superstructure is carried upon the structural angle 16; and the adaptation of the cooling means of the invention to this portion of the structure is manifest on a glance at Fig. I. The air here injected from an extended header 130 through the slot or interval 14 and effecting the desired localized cooling of the glass, is caught up by the stream of flame and swept to the exhaust port.

It is desirable that along the bridge wall 4 also the glass be cooled at the margin of the pool. The bridge wall extends beneath the span of the vault 9. Accordingly, as shown in Figs. I, V, VI, and VII, a header 17 is provided that extends along the upper edge of the bridge wall on the outer side, and the bridge wall is capped with cover blocks 18. These cover blocks are filleted on their under surfaces, and upon these fillets the cover blocks rest, making contact upon the upper edges of the tank blocks and forming shallow orifices 19. Through these orifices the compressed cold air from header 17 has access to the furnace chamber, and with effect such as has already been described in connection with the orifices 14.

It is manifest that the bridge wall, bearing as it does the cover blocks 18, is not limited nor confined thereby, but is freely responsive to the thermal expansion and contraction of the tank as a whole. The bridge wall accordingly may be benched in its foundation upon the floor blocks, as the drawing (Fig. V) shows it to be.

We claim as our invention:

1. In a glass furnace that includes a tank formed of refractory material and adapted to contain a pool of molten glass, and an overarching superstructure forming a furnace chamber adapted to receive and to confine above the surface of said pool a stream of flame, with firing and outgo ports opening through opposite walls of said superstructure; the invention herein described comprising a slot-like passageway extending peripherally of the rim of said tank and opening inwardly into the furnace chamber above said rim of the tank and below the adjacent portions of said superstructure, and means for directing inwardly through said passageway into the furnace chamber streams of cooling gas, whereby wear upon the tank wall is retarded and sting-out prevented.

2. In a glass furnace that includes a tank formed of refractory material and adapted to contain a pool of molten glass, and an overarching superstructure forming a furnace chamber adapted to receive and to confine above the surface of said pool a stream of flame, with firing and outgo ports opening through opposite walls of said superstructure; the invention herein described comprising a slot-like passageway extending peripherally of the rim of said tank and opening inwardly into the furnace chamber above said rim of the tank and below the adjacent portions of said superstructure, and means for directing inwardly through said passageway into the furnace chamber relatively cold compressed air, whereby a wear-reducing cooling effect is maintained upon the surfaces of said tank at its rim.

3. In a glass furnace that includes a tank formed of refractory material and adapted to contain a pool of molten glass, and an overarching superstructure forming a furnace chamber adapted to receive and to confine above the surface of said pool a stream of flame, with firing and outgo ports opening through opposite walls of said superstructure; the invention herein described comprising a slot-like passageway extending peripherally of the rim of said tank and opening inwardly into the furnace chamber above said rim of the tank and below the adjacent portions of said superstructure, and means for directing inwardly through said passageway into the furnace chamber a gaseous stream under pressure of varying degree throughout the longitudinal extent of the rim of the tank.

4. In a glass furnace that includes a tank formed of refractory material and adapted to contain a pool of molten glass, and an overarching superstructure forming a furnace chamber adapted to receive and to confine above the surface of said pool a stream of flame, with firing and outgo ports opening through opposite walls of said superstructure; the invention herein described comprising a slot-like passageway extending peripherally of the rim of said tank and opening inwardly into the furnace chamber above said rim of the tank and below the adjacent portion of said superstructure, and means for directing inwardly through said passageway into the furnace chamber relatively cold compressed air under pressure which is less adjacent the wall through which said firing port opens than the wall through which said outgo port opens.

5. The method herein described of prolonging the utility of the refractory side wall of the tank of a glass furnace which comprises substantially continuously injecting along the rim of the side wall streams of cool gas inward into the furnace immediately above the surface of the bath of molten glass in the tank, said streams being so disposed as to form a substantially continuous sheet covering substantially the entire rim of the side wall.

6. The method herein described of prolonging the utility of the refractory side wall of the tank of a glass furnace having firing ports and outlet ports for the products of combustion, said method comprising substantially continuously injecting along the rim of the side wall streams of cool gas inward into the furnace immediately above the surface of the bath of molten glass in the tank to entrain such gas with the products of combustion delivered from the furnace through said outlet ports, said streams being so disposed as to form a substantially continuous sheet covering substantially the entire rim of the side wall.

7. The method herein described of inhibiting "sting out" and prolonging the utility of the refractory side walls of the tank of a glass furnace having firing ports along one side and outlet ports for the products of combustion along the opposite side, said method comprising injecting along the rim of the tank on the opposite sides of the furnace streams of cool gas inward into the furnace chamber immediately above the surface of the bath of molten glass in the tank, and delivering the streams of said gas under greater pressure on the outlet port side of the furnace than on the firing port side, and entraining such gas with the products of combustion delivered from the furnace through said outlet ports.

JOHN H. McKELVEY.
JOHN W. ROGERS.

REFERENCES CITED

The following references are of record in the file of this patent:

UNITED STATES PATENTS

| Number | Name | Date |
|---|---|---|
| 1,034,824 | Owens | Aug. 6, 1912 |
| 1,237,283 | Bergman | Aug. 21, 1917 |
| 1,967,025 | Goodwillie | July 17, 1934 |
| 2,010,055 | Brown | Aug. 6, 1935 |
| 2,042,560 | Stewart | June 2, 1936 |
| 2,056,531 | Morton | Oct. 6, 1936 |
| 2,119,947 | Blau et al. | June 7, 1938 |
| 2,163,405 | McKelvey et al. | June 20, 1939 |
| 2,199,355 | Underwood | Apr. 30, 1940 |
| 2,212,358 | Weekley | Aug. 20, 1940 |
| 2,246,053 | Magrini | June 17, 1941 |

FOREIGN PATENTS

| Number | Country | Date |
|---|---|---|
| 6,204 | Great Britain | Mar. 22, 1899 |